Jan. 26, 1932.  M. OSNOS  1,842,916
STATIC FREQUENCY CHANGER
Filed March 19, 1926
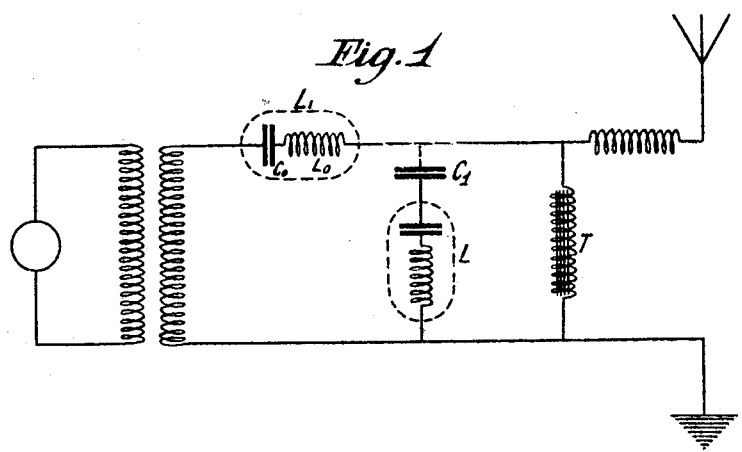
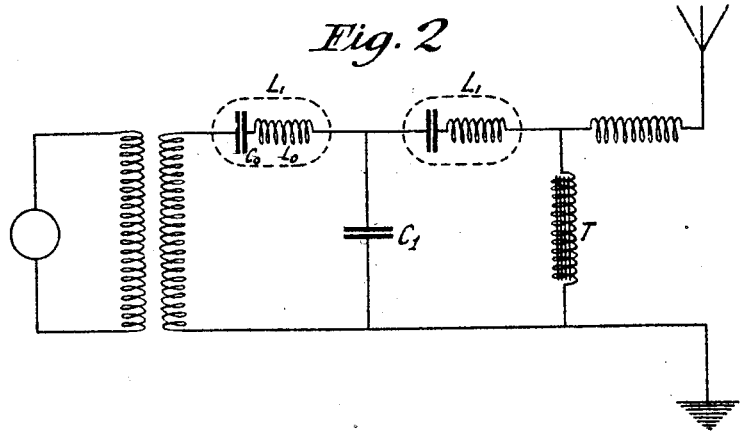
Inventor
MENDEL OSNOS
By his Attorney Patented Jan. 26, 1932

1,842,916

UNITED STATES PATENT OFFICE

MENDEL OSNOS, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

STATIC FREQUENCY CHANGER

Application filed March 19, 1926, Serial No. 96,077, and in Germany March 19, 1925.

The present invention relates to an improvement of the circuit arrangement disclosed in German Patent No. 412,576 by suitable selection of dimensions.

Figs. 1 and 2 illustrate diagrammatically two arrangements according to the invention.

In the drawings, there is shown a condenser $C_1$ arranged in parallel with a static frequency changer T for wholly or partly supplying magnetizing current to said frequency changer. To prevent harmonics from reaching the capacitive branch and thus throwing a load on the condenser, with the result that said condenser becomes heated, and also to avoid any possible tendency for the arrangement to assume a two-wave characteristic due to the fact that the circuit consisting of the windings and the parallel connected capacity is excited, thereby tending to make the circuit oscillate, a so called stopper system $L_1$ formed by a self-inductance and a capacity which is tuned exactly or approximately to the fundamental wave is inserted in the connection between the transformer winding and the parallel capacity as shown in Fig. 1, by $L_1$ (below $C_1$) or as shown in Fig. 2 by $L_1$ (to the right of $C_1$). The stopper system may be connected as shown in Fig. 2 on each side of the condenser branch. That is, there is inserted in the circuit which is formed of the windings of the transformer and the parallel condensers, a system made up of a series arrangement of inductive and capacitive impedances, which wholly or partly is tuned to the fundamental wave. The improvement consists in that also the tuning means $C_oL_o$ are tuned wholly or partly to the fundamental wave, the self-inductance of the variometer $L_1$ including the preceding inductance. This means that if the machine is directly connected to the circuit (without the potential transformer), it is necessary to include in $L_o$ also the self-inductance of the alternator and of the leads; but if, as shown in the accompanying drawings, the machine is connected by means of a potential transformer, the self-inductances of the machine, the supply leads, and the transformer leakage to be added in the calculation must be referred to the secondary circuit of the transformer.

The improvement as outlined, apart from the fact that it affords protection to the alternator against higher harmonics, offers this further substantial advantage that the starting of the arrangement is free from any transient "tilting" phenomena whatever due to the fact that since the part of the circuit up to the terminals of the circuit containing the parallel condenser $C_1$ is tuned to the fundamental wave, it will be seen that the terminal potential of the frequency changer, in so far as its fundamental wave comes into consideration, is equal or proportional to the internal voltage of the machine and hence constant, irrespective of what the load of the installation may be. Hence, the necessary current will be set up in the frequency changer quite readily when switching in the alternator.

Having thus described my invention, I wish to be limited only by the extent recited in the following claims:—

1. A static frequency changer circuit comprising a fundamental frequency wave generator and a utilizing circuit including a frequency changer device, a multi-step filter circuit disposed between said fundamental frequency generator and said utilizing circuit, means for coupling said fundamental frequency generator to the input of the first step of said filter circuit and means comprising said frequency changer device for coupling the output of the last step of said filter device to said utilizing circuit, each step of said filter device except the first including a series arrangement of inductive and capacitive elements tuned to the frequency of the fundametal wave generator, the first step of said filter device comprising a series arrangement of inductive and capacitive elements so proportioned that together with all preceding reactances including the reactance of said generator and said generator coupling means said first step of said filter device forms a circuit tuned to the fundamental wave frequency.

2. A static frequency changer circuit comprising a fundamental frequency wave generator, a utilizing circuit including a frequency changer device, a filter circuit having an input and an output, said filter circuit including a series arrangement of capacitive and inductive elements forming a circuit tuned to the frequency of the fundamental wave, means comprising said frequency changer device for coupling said utilizing circuit to the output of said filter circuit, a second filter circuit having an input and an output, means comprising a condenser for coupling the output of said second filter circuit to the input of said first named filter circuit, means for coupling said fundamental frequency generator to the input of said second named filter circuit, said second named filter circuit including a series arrangement of inductive and capacitive elements so proportioned that together with all preceding reactances, including the reactance of said generator and said generator coupling means, said second named filter circuit will be tuned to the fundamental wave frequency.

MENDEL OSNOS.